(12) United States Patent
Engle

(10) Patent No.: US 9,715,756 B2
(45) Date of Patent: Jul. 25, 2017

(54) RENDERING 3-D SCENES USING BENT RAYS

(71) Applicants: SONY CORPORATION, Tokyo (JP); SONY PICTURES TECHNOLOGIES, INC., Culver City, CA (US)

(72) Inventor: Robert B. Engle, Encino, CA (US)

(73) Assignees: SONY CORPORATION, Tokyo (JP); SONY PICTURES TECHNOLOGIES, INC., Culver City, CA (US)

( * ) Notice: Subject to any disclaimer, the term of this patent is extended or adjusted under 35 U.S.C. 154(b) by 197 days.

(21) Appl. No.: 13/781,513

(22) Filed: Feb. 28, 2013

(65) Prior Publication Data

US 2014/0240316 A1    Aug. 28, 2014

(51) Int. Cl.
*G06T 15/60* (2006.01)
*G06T 15/06* (2011.01)

(52) U.S. Cl.
CPC .................................. *G06T 15/06* (2013.01)

(58) Field of Classification Search
CPC ....... G06T 15/06; G06T 15/506; G06T 15/50; G06T 15/80; G06T 15/60
USPC ......................................................... 345/426
See application file for complete search history.

(56) References Cited

U.S. PATENT DOCUMENTS

| | | |
|---|---|---|
| 2003/0067422 A1 | 4/2003 | Suyama et al. |
| 2010/0110069 A1* | 5/2010 | Yuan .................. G06T 15/20 345/419 |

FOREIGN PATENT DOCUMENTS

JP   2012098951 A   5/2012

OTHER PUBLICATIONS

D. Weiskopf, T. Schafhitzel, and T. Ertl, "GPU-Based Nonlinear Ray Tracing", Eurographics, vol. 23 (2004), No. 3.*
Marc Berger, Terry Trout, and Nancy Levit, "Ray tracing mirages", IEEE Computer Graphics and Applications 10, 3 (1990), 41. 36-41.*
"Lecture 2: Introduction to Ray Tracing", Yong-jin Kwon, Sep. 13, 2009).*
Ramalingam, et al., "The Ligh-Path Less Traveled", CVPR Proceedings of the 2011 IEEE Conference on Computer Vision and Pattern Recognition, IEEE Computer Society Washington, DC, USA pp. 3145-3152 (2011).
Kerr, W., et al., "BendyLights: Artistic Control of Direct Illumination by Curving Light Rays", Blackwell Publishing, Ltd., Eurographics Symposium on Renderings, Computer graphics Forum 29(4):1451-1459 (2010).

* cited by examiner

*Primary Examiner* — Ke Xiao
*Assistant Examiner* — Gordon Liu
(74) *Attorney, Agent, or Firm* — Procopio, Cory, Hargreaves & Savitch LLP

(57) ABSTRACT

Rendering a 3-D scene using bent ray, including; tracing a path of the bent ray from a camera to an object for each pixel in a view window, wherein the amount of bending in the bent ray is a function of the distance from the camera; rendering the each, pixel in the view window until all pixels in the view window have been rendered; and outputting the rendered view window as a rendered 3-D scene. Keywords include bent rays and object depth.

6 Claims, 4 Drawing Sheets

RENDERING 3-D SCENES USING BENT RAYS

BACKGROUND

Field of the Invention

The present invention relates to rendering of 3-D scenes, and more specifically, to rendering of 3-D scenes using bent rays.

Background

A 3-D graphics method such as ray tracing is a technique for rendering a 3-D scene with complex light interactions. It is based on modeling reflection and refraction by recursively following the path that light takes as it travels through the scene. To make the processing manageable, the light is traced backwards from the camera to the light source.

SUMMARY

The present invention provides for rendering a 3-D scene using bent ray.

In one implementation, a method of rendering a 3-D scene using bent ray is disclosed. The method includes: tracing a path of the bent ray iron a camera to an object for each pixel in a view window, wherein the amount of bending in the bent ray is a function of the distance from the camera; rendering the each pixel in the view window until all pixels in the view window have been rendered; and outputting the rendered view window as a rendered 3-D scene.

In another implementation, a system to render a 3-D scene using bent rays is disclosed. The system includes: a ray tracer configured to trace a path of ray from a camera to an object for each pixel on a view window; a ray bender configured to bend the path of ray as a function of the distance from the camera and a renderer configured to render the each pixel in the view window until all pixels in the view window have been rendered, wherein the renderer outputs an image on the view window as a rendered 3-D scene.

In a further implementation, a non-transitory storage medium storing a computer program to render a 3-D scene using bent ray is disclosed. The computer program includes executable instructions that cause a computer to: trace a path of the bent ray from a camera to an object for each pixel in a view window, wherein the amount of bending in the bent ray is a function of the distance from the camera; render the each pixel in the view window until all pixels in the view window have been rendered; and output the rendered view window as a rendered 3-D scene.

Other features and advantages of the present invention will become more readily apparent to those of ordinary skill in the art after reviewing the following detailed description and accompanying drawings.

DETAILED DESCRIPTION

Certain implementations as disclosed herein provide for rendering 3-D scenes using bent rays, and without using multiple passes. In one implementation, rendering 3-D scene also includes simulating 3-D multiple camera perspective. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

Human eyes are generally about 6 to 7 cm apart, and therefore each eye has a slightly different view of an object. Since the distance between left and right eyes causes a disparity of an image, an image having a stereoscopic effect can be perceived by assembling the disparity in the brain. This principle is basically applied to produce a 3-D scene having one image for the left eye and another image slightly offset for the right eye. Thus, a depth of the object can be felt by perceiving a parallax difference caused by the differently observed images of the left and right eyes.

A common technique for rendering a 3-D scene is to trace light rays from the camera to the light source. In practice, the light rays are traced from the camera to object(s) (if one exists in the light path) and then to the light source. However, this technique ignores the reality that the depth falls off with the distance of the object from the camera. Accordingly, some 3-D rendering techniques may include making multiple passes to render foreground and background separately.

Figure 1A:
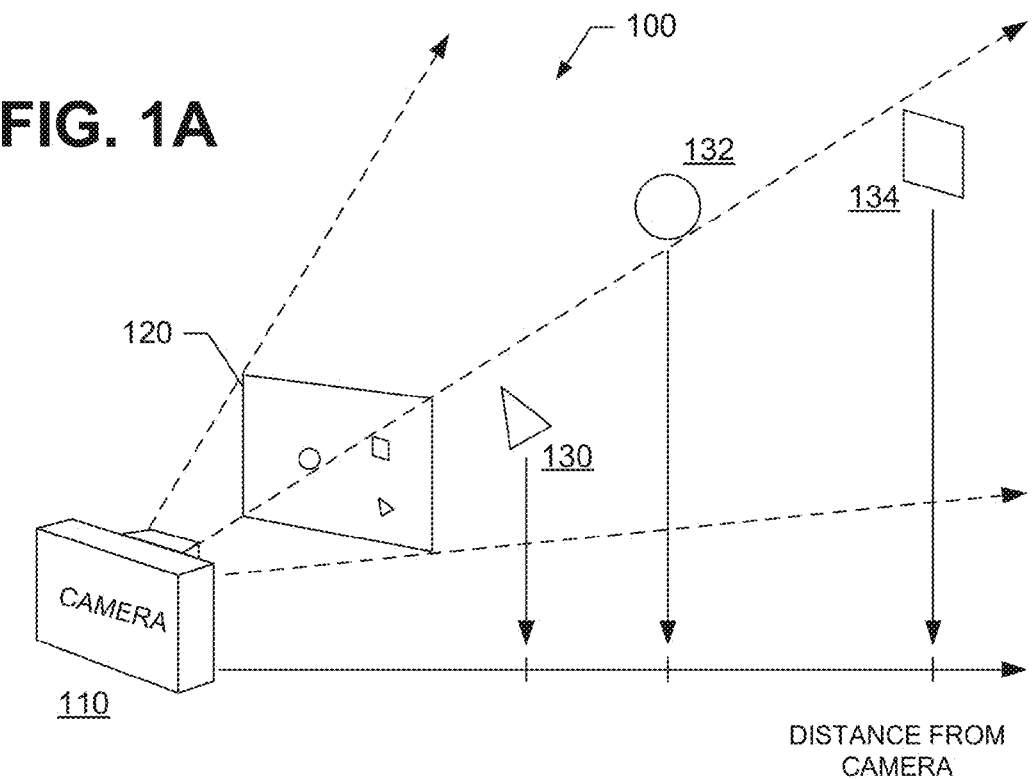
FIG. 1A is a functional diagram of a technique of rendering objects within the 3-D scene.

Referring to FIG. 1A, for example, a 3-D scene 100 comprises a camera 110 and a view window 120 (e.g., a virtual window for rendering purposes) through which objects 130, 132, 134 within the 3-D scene are observed. In the case of ray tracing, a straight line ray of light can be traced from the camera 110 through each pixel in the view window 120 to determine the color of that pixel. The rendering completes when the ray of light has been traced through all of the pixels in the view window 120. To preserve the depth perception, a renderer may render objects 130 and 132 in a first pass, and render object 134 in a second pass.

Figure 1B:
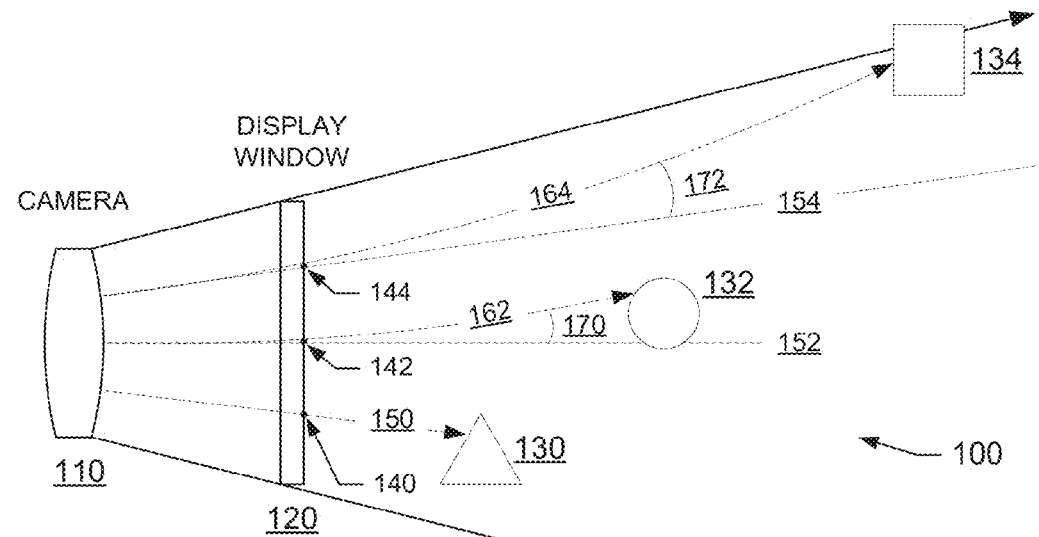
FIG. 1B is a top view of a functional diagram of a technique of rendering objects within the 3-D scene using bent ray in accordance with one implementation of the present invention.

FIG. 1B shows a top view of a functional diagram of an alternative technique of rendering objects within the 3-D scene 100 using bent ray in accordance with one implementation of the present invention. In the example of FIG. 1B, paths of rays 150, 162, 164 are traced from the camera 110 to objects 130, 132, 134 through pixels 140, 142, 144, respectively, to render those pixels. Thus, in this case, the paths of rays 150, 162, 164 are not ail straight lines 150, 152, 154. It can be seen that the curvature of each path of ray is dependent on the distance of the object from the camera. For example, pixel 140 is rendered by tracing a path of ray 150 with no bending because object 130 is close to the camera 110. Pixel 142 is rendered by tracing a path of ray 162 with a curvature angle of 170 because object 132 is further away than object 130. Pixel 144 is rendered by tracing a path of ray 164 with a curvature angle of 172 which is larger than that for pixel 142 because the object 134 is much farther away from the camera 110 than object 132. In one implementation, the direction of the curvature can be predetermined. In another implementation, the direction of the curvature can be a function of other parameters such as a distance between the cameras in a 3-D setup.

Regarding pixel 142, it can be seen that the straight line ray 152 hits object 132 at different point than the path of ray 162 (i.e., bent ray). Accordingly, the color for pixel 142 may be rendered slightly differently. Further, regarding pixel 144, the straight line ray 154 does not hit object 134, whereas the path of ray 164 hits object 134. Accordingly, the color for pixel 144 will be rendered substantially differently.

Figure 2:
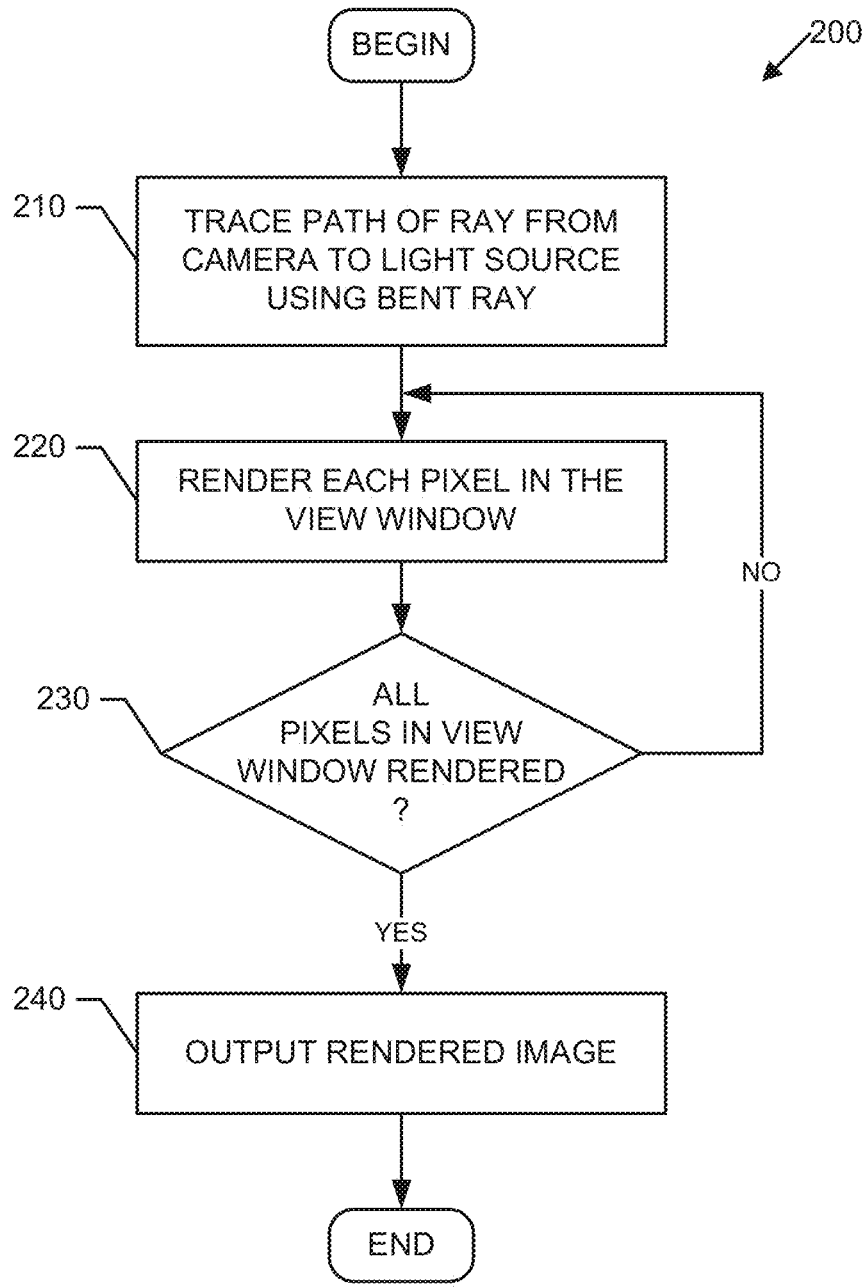
FIG. 2 is a flowchart illustrating a technique for rendering 3-D scenes using bent rays.

FIG. 2 is a flowchart illustrating a technique 200 for rendering 3-D scenes using bent ray. In one implementation, rendering the 3-D scene comprises simulating 3-D multiple camera perspective wherein depths of objects and characters (collectively referred to as "objects") in the 3-D scene are simulated using bent rays.

In the illustrated implementation of FIG. 2, the 3-D rendering is initiated by tracing a path of ray from the camera to the object for each pixel on the view window (e.g., 120 in FIGS. 1A and 1B), at box 210. For each path of ray traced, the path is progressively bent or curved as a function of the distance from the camera. Alternatively, the path may be bent piece-wise linearly, meaning the angle of curvature will stay constant for a preset distance, and will change to a new angle of curvature for another preset distance, and so on. The piece-wise division of the path of ray results in the number of segments in the divided path to be directly proportional to the total curvature of the bent ray. In a further implementation, the 3-D scene may be divided into zones of objects, wherein all objects in the same zone will have the same angle of curvature. In yet another implementation, the angle of curvature can be manually adjusted to adjust the depth perception for foreground and background objects.

In one implementation, a path of ray is traced from the camera to the object using bent rays, and then the path from the object to the light source is left as a straight ray. In an alternative implementation, global illumination techniques are used to trace from lights to objects and then do either a ray trace (e.g., camera to light or vice-versa) or a modified scanline technique which takes into account camera distance to object. The scanline technique passes a ray from the camera through every pixel of the rendered image, and if the ray crosses a mesh object, the color of the pixel is calculated according to the light sources, their angle to the normal of the object, the angle of the camera to that object and other information. If no object is encountered, the pixel gets the color of the background. In this manner, the renderer scans all pixels line after line.

Therefore, for pixels that are going to receive light from far objects, the color will be determined by the color of object that the bent ray with a large curvature would hit. For example, referring to FIG. 1B, the color of pixel 144 may be determined to be white since the straight line ray 154 does not hit any object. However, based on the fact that the path of ray 164 is bent with a curvature angle of 172, it hits object 134. Therefore, the color of pixel 144 will be determined to be the color of object 134 at the point of impact, instead of white. Based on the above description, each pixel in the view window is rendered, at box 320. The rendering of the pixels in the view window will be repeated until it is determined, at box 230, that all pixels in the view window have been rendered. Once all pixels in the view window have been rendered, the rendered image is output, at box 240, and may be displayed.

Figure 3:
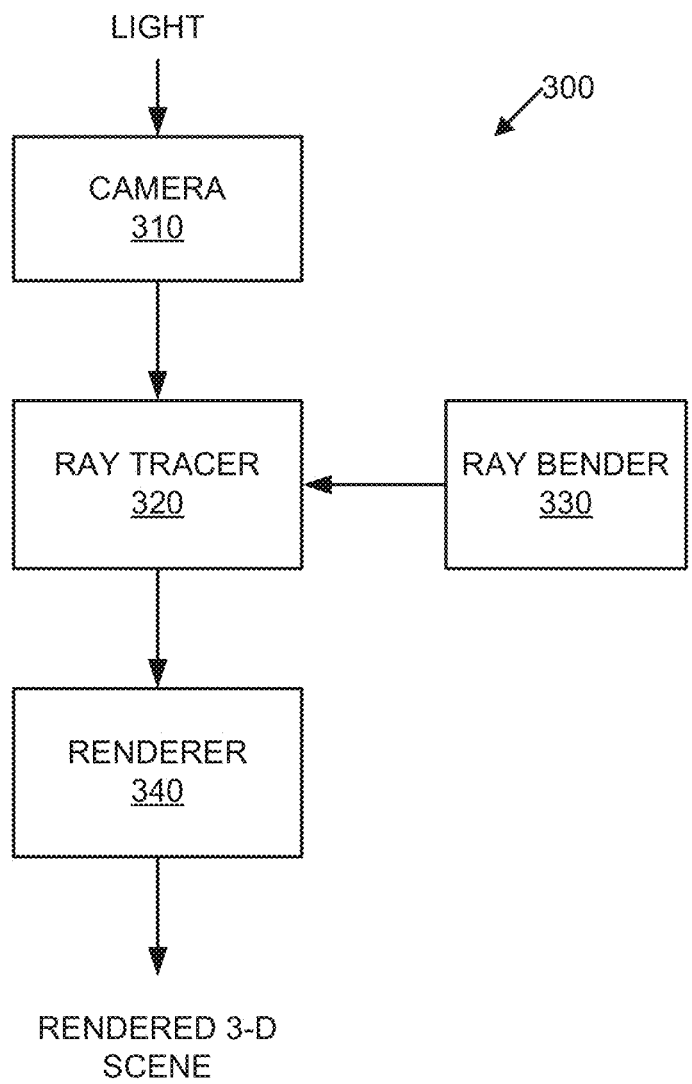
FIG. 3 is a functional block diagram of one implementation of a system for rendering a 3-D scene using bent rays.

FIG. 3 is a functional block diagram of one implementation of a system 300 for rendering a 3-D scene using bent ray. The rendering system 300 includes a camera 310, an ray tracer 320, a ray bender 330, and a renderer 340. The camera 340 captures an image as light reflecting from objects within a 3-D scene. In an alternative implementation, the camera 340 is a virtual camera module configured to output a scene description of a computer graphics (CG) image of the 3-D scenep In the illustrated implementation of FIG. 3, rendering is initiated by the ray tracer 320 which traces a path of ray from the camera 310 to the object for each pixel on the view window. For each path of ray traced, the ray bender 330 progressively bends or curves the path as a function of the distance from the camera. Therefore, for pixels that are going to receive light from far objects, the color will be determined by the color of object that the bent ray with a large curvature would hit. The renderer 240 renders each pixel in the view window until all pixels in the view window have been rendered. Once all pixels in the view window have been rendered, the rendered image is output and may be displayed.

Figure 4A:
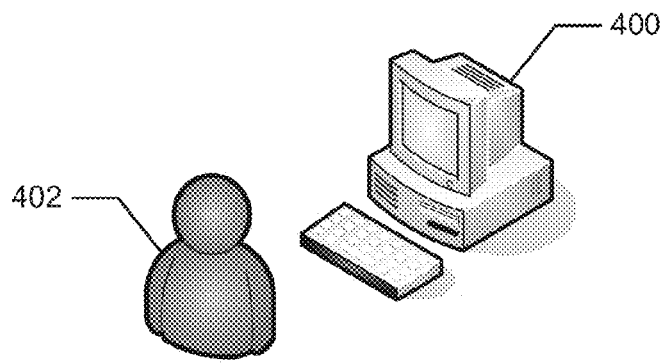
FIG. 4A illustrates a representation of a computer system and a user.

FIG. 4A illustrates a representation of a computer system 400 and a user 402. The user 402 uses the computer system 400 to perform various operations described with respect to FIGS. 2 and 3. Thus, the computer system 400 includes a system 490 for rendering a 3-D scene using bent rays similar to a system 300.

Figure 4B:
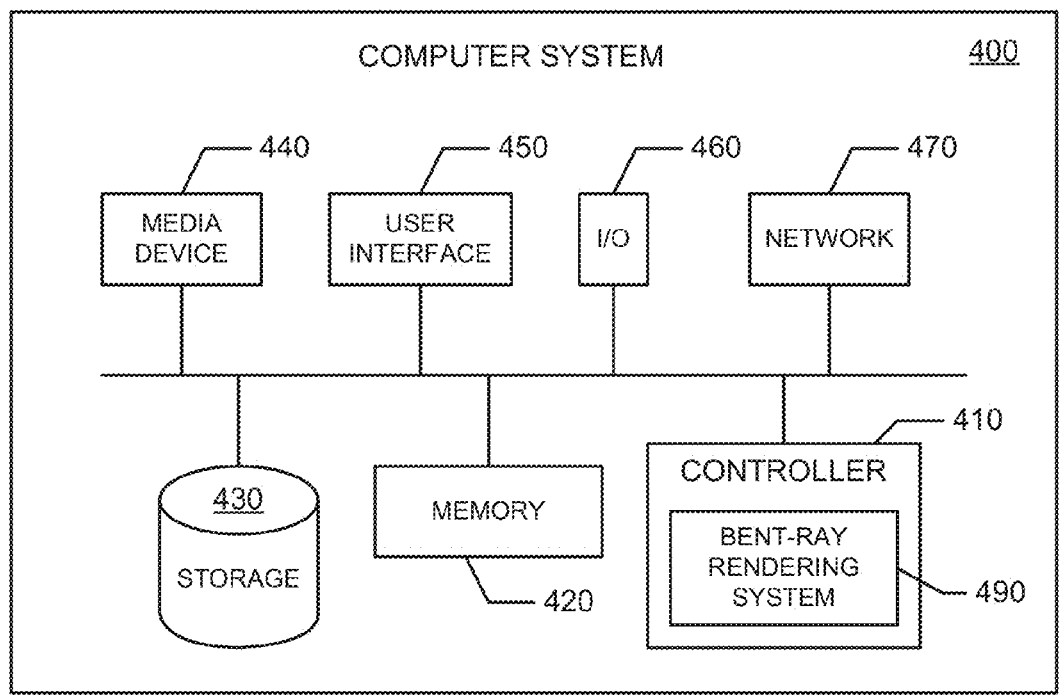
FIG. 4B is a functional block diagram illustrating the computer system hosting a bent-ray rendering system.

FIG. 4B is a functional block diagram illustrating the computer system 400 hosting the bent-ray rendering system 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the bent-ray rendering system 490 as a software system. Alternatively, this system can he implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Non-transitory storage 430 stores data for use by other components of the computer system 400, such as for storing data used by the bent-ray rendering system 490. In one implementation, storage 430 is a hard disk drive.

The media device 440 receives removable media arid reads and/or writes data to the inserted media. In one implementation, for example, the media device 440 is an optical disc drive.

The user interface 450 includes components for accepting user input from the user 402 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O Interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, although the description is directed to a technique for rendering 3-D scenes comprising simulating 3-D multiple camera perspective, the technique can be used to simulate special camera effects, such as treatment of a wide angle lens in the background and a long lens in the foreground. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of rendering a 3-D scene using a plurality of bent rays from a camera, the method comprising:
   receiving distance information from the camera to objects in the 3-D scene;
   determining a curvature angle of each bent ray of the plurality of bent rays corresponding to each pixel in a view window using the distance information,
   wherein the view window is a virtual window through which the objects within the 3-D scene are observed;
   tracing a path of each bent ray from the camera to each object in the 3-D scene through the view window to enable the rendering of the 3-D scene,
   wherein the path of each bent ray follows the determined curvature angle,
   wherein tracing a path of each bent ray includes piece-wise linearly bending the path of each bent ray such that the amount of bending stays constant for a preset distance, and
   wherein the piece-wise linear bending of each bent ray comprises dividing the path such that a number of segments in the divided path is directly proportional to the curvature angle of each bent ray;
   rendering each pixel in the view window until all pixels in the view window have been rendered,
   wherein a color for each pixel in the view window is determined by a color of the object in the traced path of each bent ray from the camera to each object; and
   outputting the rendered view window as a rendered 3-D scene.

2. The method of claim 1, further comprising
   dividing the 3-D scene into zones of objects,
   wherein all objects in the same zone are traced with the same curvature angle for each bent ray.

3. A system to render a 3-D scene using a plurality of bent rays from a camera, the system comprising:
   a ray bender configured to determine a curvature angle of each bent ray of the plurality of bent rays corresponding to each pixel in a view window using distance information from the camera to objects in the 3-D scene,
   wherein the view window is a virtual window through which the objects in the 3-D scene are observed;
   a ray tracer configured to trace a path of each bent ray from the camera to each object in the 3-D scene of the view window to enable the rendering of the 3-D scene,
   wherein the path of each bent ray follows the curvature angle determined by the ray bender, and
   wherein the ray bender is configured to bend the path of each bent ray piece-wise linearly such that the amount of bending stays constant for a preset distance;
   a path divider configured to divide the path such that a number of segments in the divided path is directly proportional to the curvature angle of each bent ray; a renderer configured to render each pixel in the view window until all pixels in the view window have been rendered,
   wherein a color for each pixel in the view window is determined by a color of the object in the traced path of each bent ray from the camera to each object; and
   a display configured to display an image on the view window as a rendered 3-D scene.

4. The system of claim 3, further comprising
   a scene divider to divide the 3-D scene into zones of objects,
   wherein all objects in the same zone are traced with the same curvature angle for each bent ray.

5. A non-transitory storage medium storing a computer program to render a 3-D scene using a plurality of bent rays from a camera, the computer program comprising executable instructions that cause a computer to:
   receive distance information from the camera to objects in the 3-D scene;
   determine a curvature angle of each bent ray of the plurality of bent rays corresponding to each pixel in a view window using the distance information,
   wherein the view window is a virtual window through which the objects within the 3-D scene are observed;
   trace a path of each bent ray from the camera to each object in the 3-D scene through the view window to enable the rendering of the 3-D scene,
   wherein the path of each bent ray follows the determined curvature angle,
   wherein the executable instructions that cause the computer to trace a path of each bent ray includes executable instructions that cause the computer to piece-wise linearly bend the path of each bent ray such that the amount of bending stays constant for a preset distance, and
   wherein the executable instructions that cause the computer to piece-wise linearly bend each bent ray comprises the executable instructions that cause the computer to divide the path such that a number of segments in the divided path is directly proportional to the curvature angle of each bent ray;
   render each pixel in the view window until all pixels in the view window have been rendered,
   wherein a color for each pixel in the view window is determined by a color of the object in the traced path of the bent ray from the camera to each object; and
   output the rendered view window as a rendered 3-D scene.

6. The non-transitory storage medium of claim 5, further comprising executable instructions that cause the computer to divide the 3-D scene into zones of objects,
wherein all objects in the same zone are traced with the same curvature angle for each bent ray.

* * * * *